May 18, 1948.  G. W. JOHNSON  2,441,884
EGG DRYING APPARATUS WITH CONVEYOR PROVIDING ZIGZAG PATHS
Filed April 15, 1944  4 Sheets-Sheet 1

INVENTOR,
Gordon W. Johnson.
BY Roy E Hamilton
Attorney

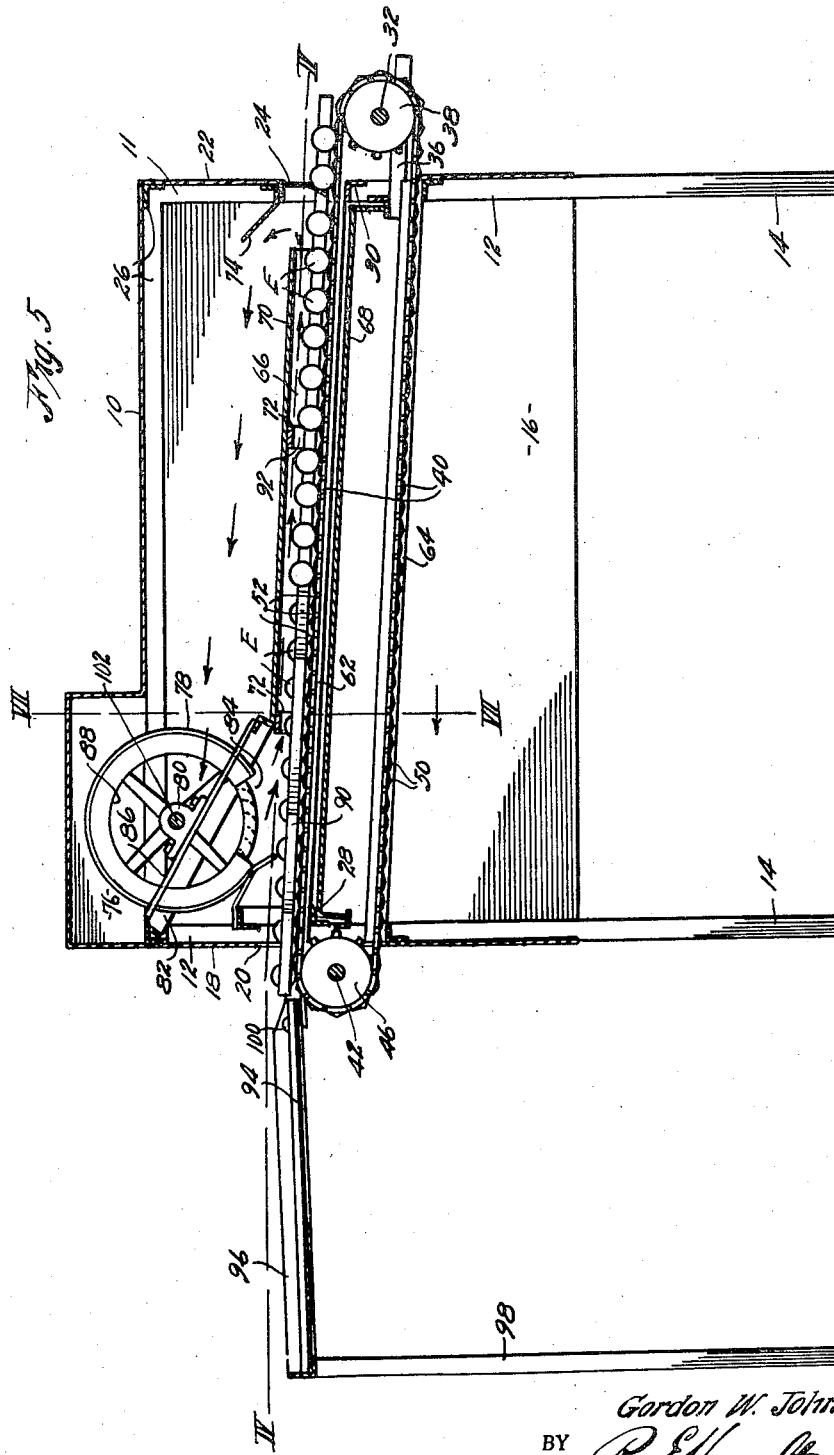

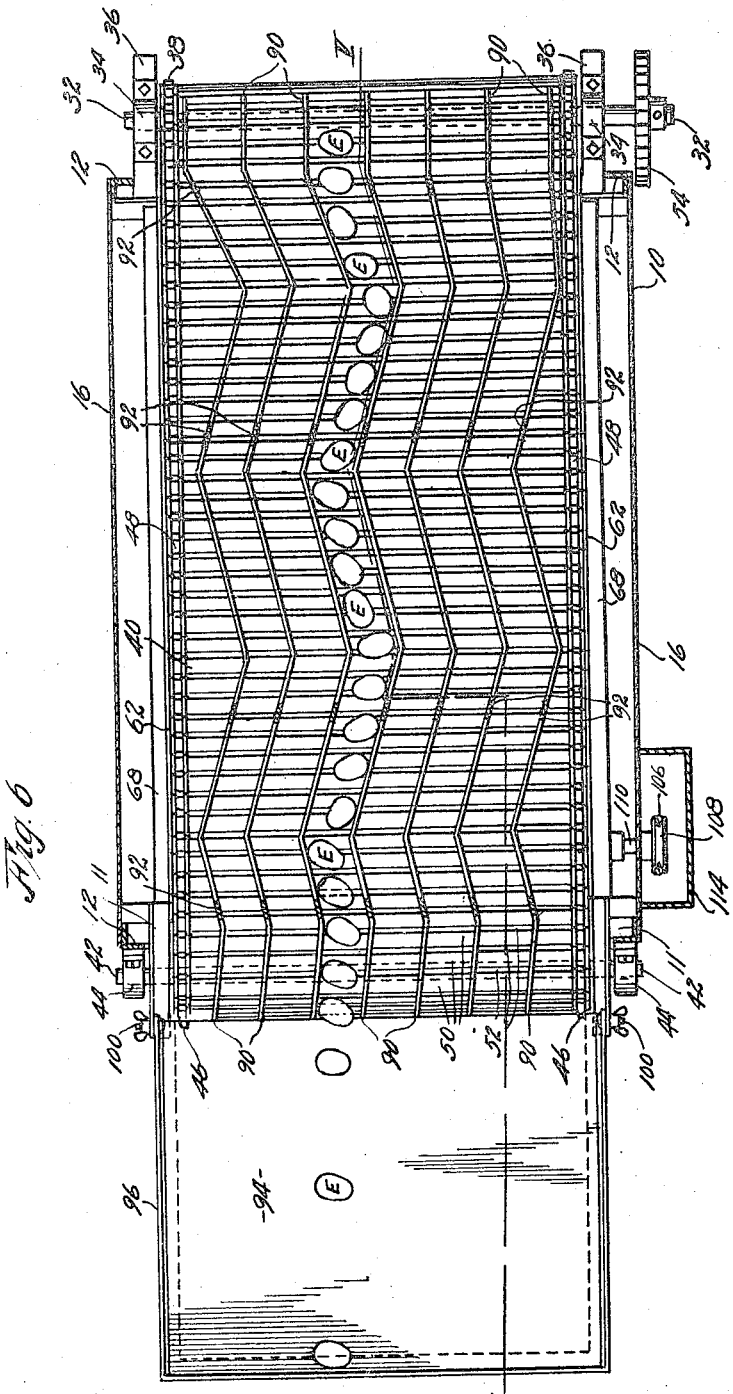

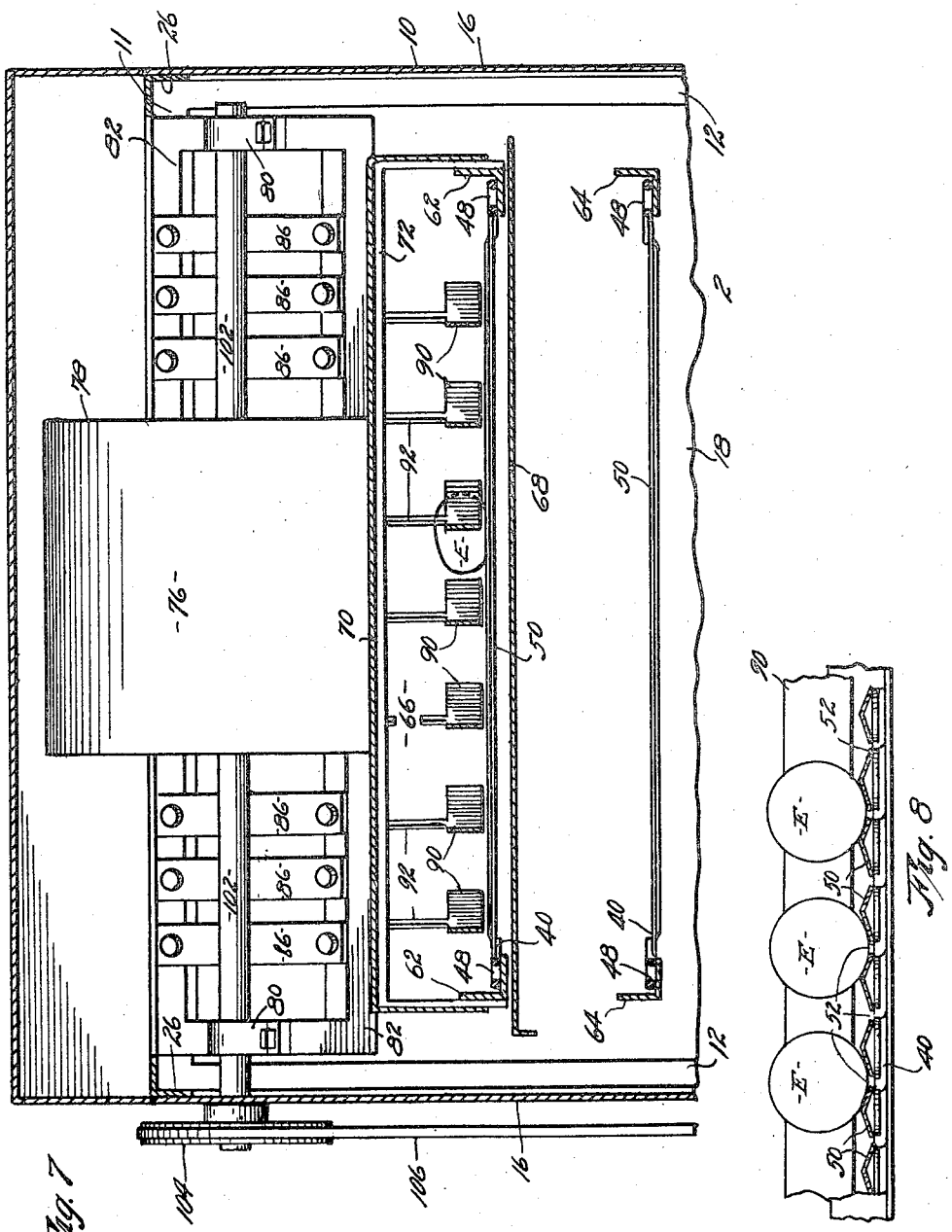

Patented May 18, 1948

2,441,884

UNITED STATES PATENT OFFICE 2,441,884

EGG DRYING APPARATUS WITH CONVEYOR PROVIDING ZIGZAG PATHS

Gordon W. Johnson, Overland Park, Kans., assignor to Gordon Johnson Company, Kansas City, Mo., a corporation of Missouri Application April 15, 1944, Serial No. 531,228

5 Claims. (Cl. 34—205)

This invention relates to improvements in drying apparatus and has particular reference to a drying apparatus suitable for use in conjunction with an egg washing machine. Reference is had to my pending application, Serial No. 522,186, for "Egg washing machine," filed February 10, 1944, wherein is shown an egg washing machine operating in conjunction with the drying apparatus, not shown in detail.

The principal object of the present invention is the provision of a drying apparatus wherein articles such as eggs, etc., are subjected to a draft of hot air while they are being moved on a conveying means to prevent the accumulation of drops of water thereon.

A further object of this invention is the provision of a drying apparatus including a housing wherein is mounted a conveyor having depressions to receive rows of eggs in longitudinally spaced apart relation operating in conjunction with stationary spaced apart partition strips disposed in the general direction of the travel of said conveyor and adapted to cause transverse movement of the eggs on the conveyor as they are being moved forwardly.

Other objects are simplicity and economy of construction, ease and efficiency of operation and adaptability for use in drying articles of similar shape and size.

With these objects in view as well as other objects which will appear during the course of the specification, reference will now be had to the drawings wherein:

Fig. 5 is a sectional view taken on line V—V of Fig. 6.

Fig. 6 is a horizontal sectional view taken on line IV—IV of Fig. 5.

Fig. 7 is an enlarged cross sectional view of the upper portion of the drying apparatus taken on line VII—VII of Fig. 5.

Fig. 8 is an enlarged fragmentary sectional view of a portion of the conveyor and associated parts.

Figure 1:
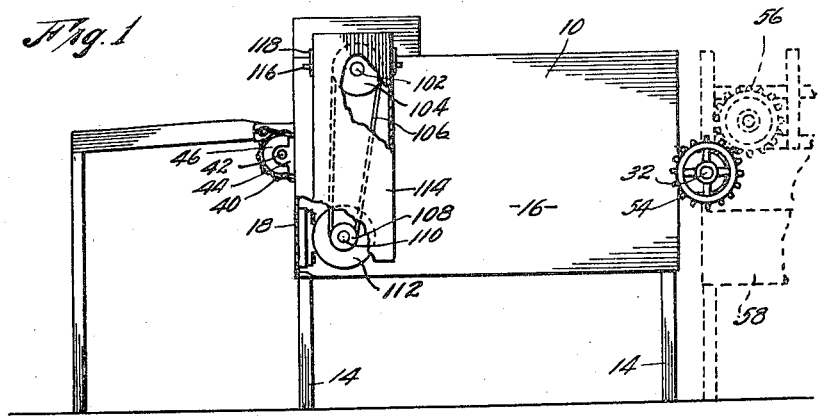
Fig. 1 is an elevational view partly broken away of a drying apparatus embodying this invention including in dotted lines, a portion of a washing machine with which it may be operated.
Figure 2:
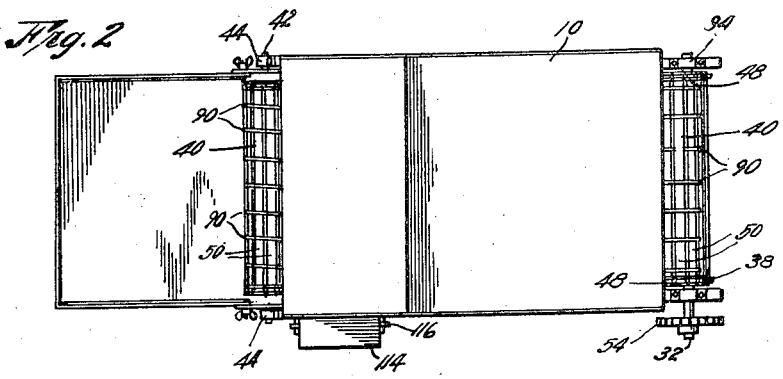
Fig. 2 is a plan view of the drying apparatus shown in Fig. 1.
Figures 3, 4:
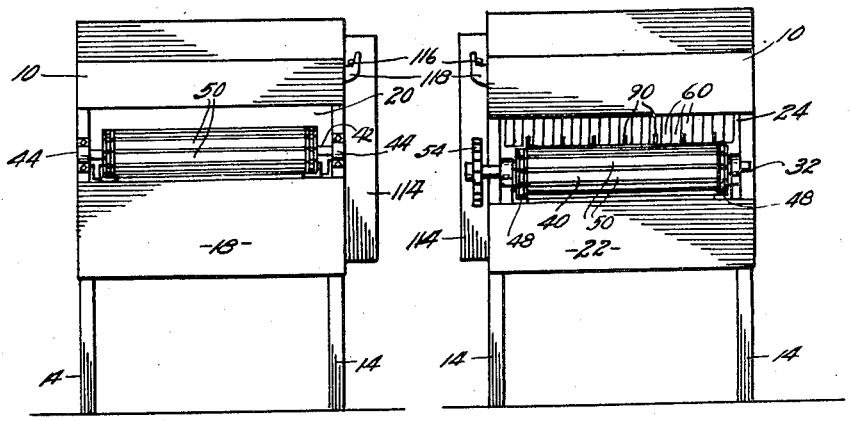
Fig. 3 is a front elevation of the drying apparatus with the receiving tray removed.
Fig. 4 is a rear elevation of the drying apparatus.

Throughout the several views like reference characters refer to similar parts and the numeral 10 designates a housing supported on the angle iron frame 11 including vertically disposed angle irons 12 which extend below the housing to present legs 14; sheet metal side walls 16 are removably mounted on the frame to provide easy access to the operating parts. The front end plate 18 is provided with an opening 20 and the rear end plate 22 has an opening 24. The frame work 11 also includes horizontally disposed angle irons 26 at the top of the frame and transverse cross angle irons 28 and 30 disposed respectively adjacent the front and rear ends of the housing member.

A shaft 32 is transversely mounted outside the rear end of the housing in bearings 34 which are mounted on brackets 36 rigidly attached to the angle iron frame. Sprocket wheels 38 are rigidly attached to shaft 32 for carrying an endless conveyor belt 40. Shaft 42 is rotatably mounted in parallel relation to shaft 32 in bearings 44 which in turn are rigidly attached to angle irons 12 as clearly shown in Fig. 6. This shaft is provided with rigidly attached sprocket wheels 46. The endless conveyor belt 40 is an endless belt comprising sprocket chains 48 carrying transverse slats 50. A slat is attached at its opposite ends to corresponding links of the side chains 48 and are slightly spaced apart to receive eggs therebetween.

Referring to Fig. 8, it will be noted that the slats 50 are angled in cross section so as to present pockets or depressions 52 for receiving the eggs. It will be observed that the slats are so spaced that when the eggs E are positioned thereon, they will naturally take positions as shown in Fig. 8 so that they are longitudinally spaced apart to permit the free passage of warm air there-between and also to avoid as much as possible the contacting of adjacent eggs. The adjacent depressions or pockets 52 are spaced sufficiently close together so that the eggs would not normally be located in adjacent depressions. Shaft 32 at one of its ends extends outwardly beyond bearing 34 and is provided with a spur gear 54 which is normally in mesh with the spur gear 56 of the washer 58 shown in dotted lines of Fig. 1.

It is not desired to limit our invention to this particular type of drive since many other forms of drive such as belt drives, individual motor drives, etc., might be used. However, it is desirable that the egg dryer be maintained in synchronism with the egg washing machine in order to take care of all eggs being washed and to maintain the dryer in properly filled condition during the drying operation.

It will be noted that the endless conveyor extends through the openings 20 and 24 in the end plates with sufficient space there-above to permit the free passage of eggs to and from the drying chamber. At the inlet opening 24 it will be noted that opening 24 above the conveyor is partially closed by means of flexible tabs 60; these tabs are positioned in the path of travel of the incoming eggs and have a tendency to wipe accumulated water therefrom and also to prevent undue escape of heated air from the housing.

The side sprocket chains 48 at their upper reach rest on angle irons 62 while the lower reach rests on angle irons 64. It will be noted that these angle irons extend the full length of the housing and are rigidly attached to the angle iron frame work, thus presenting a fixed bearing for the upper and lower reaches of the endless conveyor to maintain the slats 50 in proper planar position during the drying operation. An air duct 66 is formed about the upper reach of the endless conveyor by means of a slidably mounted sheet metal table 68 positioned directly below the conveyor and an inverted U-shaped member 70 positioned thereabove a sufficient distance to permit the free passage of the eggs there-beneath. The rearward end of member 70 is spaced apart from the end wall 22 while the forward end thereof is spaced a greater distance from the front end 18 of the housing.

Brackets 72 welded or otherwise secured to angle irons 62 serve to support the U-shaped member 70 as best shown in Fig. 7. An upwardly and inwardly extending deflector 74 secured to the frame adjacent the upper edge of opening 24 serves to deflect air passing through the duct 66 into the housing chamber above member 70.

A fan 76 of the sirocco or any other suitable type having a fan housing 78 and a shaft 102 mounted in bearings 80 is carried by a removable frame 82 carried by frame 11. The housing 78 is open at 84 so as to direct the air into the air duct 66. The heated air takes the course indicated by the arrows and passes over and between the electric heat units 86 also carried by the frame 82. Since the air must enter the fan through the openings 88 at the ends of the fan housing, it is apparent that this air will come in close contact with the heating elements and will be heated to a proper degree to dry the eggs. It is intended to permit the escape of a certain percentage of the moisture laden air from the housing through partially closed opening 24 and to admit fresh air through the opening 20 which, when heated, will pick up the moisture from the eggs. It has been found that eggs placed on the endless conveyor and maintained in one position thereon will accumulate drops of water at their lower extremities due to the action of gravity. These relative large collections of water are difficult to evaporate and the following means has been provided to overcome the collections of moisture at any particular point on the eggs' surface.

Stationary, spaced apart partition strips 90 secured at spaced apart intervals by straps 92 to brackets 72 serve to maintain the strips in position just above the upper reach of endless conveyor belt 40 and in horizontal alignment with a normal egg that might be positioned on the conveyor.

Referring to Fig. 6, it will be noted that these strips are transversely offset in opposite directions throughout their length so that the eggs E will take a general zig-zag path indicated in Fig. 6. Since the slats 50 tend to move the eggs in a straight line, it will be noted that the eggs will first strike the inclined surface of one of the strips 90 and be forced transversely of the conveyor belt and then will contact the opposite strip and be moved in a reverse transverse direction. This process will be continued as the belt carries the eggs the full length of the conveyor. Due to the shape of the eggs, they have a tendency to be up-ended and turned over as they change their course of travel. This movement of the eggs causes a spreading of any accumulated moisture, thus exposing the larger surface of water to the drying effect of the heated air to increase the rate of drying. It is contemplated that the speed of the eggs through the dryer chamber shall be relatively slow so that there will be no objectionable movements of the eggs that might cause breakage.

The slidably mounted table 68 not only serves to confine the air to the air duct 66 but also serves to receive any leakage from eggs which then could be easily removed by sliding the table from the machine and cleaning the same. Due to the fact that the heated air is constantly passing over the table 68, any leakage thereon would be subjected to this heat and would tend to be congealed to prevent objectionable dripping of eggs over the dryer mechanism.

Substantially tangent with the upper surface of the sprocket wheel 46 is a removable tray 94 which is mounted in a frame 96 supported at its forward edge by legs 98 and pivotally attached to the frame 12 by means of bolts 100. The fan shaft 102 extends outwardly through housing 10 and is provided with a belt wheel 104 to receive a belt 106 which is adapted to operatively engage the drive pulley 108 mounted on the shaft 110 of motor 112 which in turn is rigidly mounted on the front wall 18 of the housing. This belt drive is protected by means of a removable housing 114 having pins 116 adapted to engage the hook members 118 carried by the side wall 16.

The dryer above described provides means for moving a plurality of rows of eggs by means of an endless belt, and to simultaneously roll the eggs transversely whereby water on the egg surfaces will be spread thereby causing the egg to be dried rapidly by a hot air current set up by the fan and heated by the electric heaters.

Many minor changes might be made in the drying structure without departing from the spirit of the invention.

What I claim as new and desire to be secured by Letters Patents is:

1. A drying apparatus comprising a housing, an endless conveyor mounted in said housing and having transverse slots formed in the surface thereof to receive a row of eggs in longitudinally spaced apart relation, and a series of spaced apart partition strips of angled zig-zag shape each composed of a plurality of straight rectilinear members and disposed in the general direction of travel of said conveyor but with the individual members of each of said strips disposed in angled relation to said direction of travel, adjacent partition strips being adapted to receive a row of eggs therebetween and to cause transverse movement and upending of said eggs as they are moved forwardly by said conveyor.

2. In a drying apparatus a housing, an endless conveyor comprising side chains and transverse bars mounted in said housing and having transverse grooves between adjacent bars to receive a row of eggs in longitudinally spaced apart relation, and a plurality of series of spaced apart straight partition strips, corresponding strips of each of said series being joined together in angled relation to form a zig-zag partition disposed in the general direction of travel of said conveyor, adjacent strips being adapted to receive a row of eggs therebetween and to cause zig-zag movement of each of said eggs as they are moved forwardly by said conveyor.

3. In a drying apparatus comprising a housing, an endless conveyor operatively mounted in said housing and adapted to receive wet eggs thereon and having transversely disposed spaced apart slots formed in the surface thereof whereby said eggs are secured in longitudinally disposed spaced apart rows, partition strips each having a plurality of rectilinear sections disposed in zig-zag angled relation and positioned adjacent the top surface of said conveyor and extending substantially the full length thereof, adapted to receive rows of eggs between adjacent strips and to cause transverse movement of said eggs as they are moved longitudinally by said conveyor, an air duct disposed adjacent said conveyer, and means whereby heated air is caused to pass through said air duct to dry the eggs carried by said conveyor.

4. In a drying apparatus comprising a housing, an endless conveyor operatively mounted in said housing and adapted to receive wet eggs thereon and having transversely disposed spaced apart slots formed in the surface thereof whereby said eggs are secured in longitudinally disposed spaced apart rows, partition strips each having a plurality of rectilinear sections disposed in zig-zag angled relation and positioned adjacent the top surface of said conveyor and extending substantially the full length thereof, adapted to receive rows of eggs between adjacent strips and to cause transverse movement of said eggs as they are moved longitudinally by said conveyor, and means whereby a current of hot air is forced about said wet eggs in a direction opposed to the travel of said conveyor.

5. In a drying apparatus comprising a housing, an endless conveyor operatively mounted in said housing and adapted to receive wet eggs thereon, and including transversely disposed apart slats whereby said eggs are secured in longitudinally spaced apart relation therebetween, longitudinally disposed spaced apart partition strips, each strip having a plurality of rectilinear sections disposed in zig-zag angled relation and positioned adjacent the top surface of said conveyor and extending substantially the full length thereof, adapted to receive rows of eggs between adjacent strips and to cause transverse movement of said eggs in opposite directions as they are moved longitudinally by said conveyor.

GORDON W. JOHNSON.

REFERENCES CITED

The following references are of record in the file of this patent:

UNITED STATES PATENTS

| Number | Name | Date |
| --- | --- | --- |
| 1,194,538 | Parker | Aug. 15, 1916 |
| 1,214,234 | Skinner | Jan. 30, 1917 |
| 1,214,519 | Demuth | Feb. 6, 1917 |
| 1,346,986 | Stamm | July 20, 1920 |
| 1,446,580 | Perry | Feb. 27, 1923 |
| 1,710,323 | Schmitt | Apr. 23, 1929 |
| 1,947,338 | Furbush | Feb. 13, 1934 |
| 1,955,749 | Jones | Apr. 24, 1934 |
| 2,096,105 | Griffith | Oct. 19, 1937 |
| 2,326,115 | Arthur | Aug. 10, 1943 |

FOREIGN PATENTS

| Number | Country | Date |
| --- | --- | --- |
| 458,518 | Germany | Apr. 12, 1928 |
| 513,185 | France | Feb. 9, 1921 |